United States Patent [19]

Tsukada et al.

[11] Patent Number: 4,591,060

[45] Date of Patent: May 27, 1986

[54] CONTAINER OF POLYETHYLENE TEREPHTHALATE OR SATURATED POLYESTER RESIN

[75] Inventors: Takami Tsukada, Funabashi; Akiho Ota; Hiroaki Sugiura, both of Tokyo, all of Japan

[73] Assignee: Yoshino Kogyosho Co., Ltd., Tokyo, Japan

[21] Appl. No.: 592,747

[22] Filed: Mar. 23, 1984

Related U.S. Application Data

[63] Continuation of Ser. No. 331,872, Dec. 17, 1981, abandoned.

[30] Foreign Application Priority Data

Jan. 29, 1981 [JP] Japan .................... 56-11949[U]

[51] Int. Cl.⁴ .................... B65D 23/00; B29C 35/00
[52] U.S. Cl. .................... 215/1 C; 215/31
[58] Field of Search .................... 215/1 C, 31, 324; 264/521, 25, 235, 520, 532, 537

[56] References Cited

U.S. PATENT DOCUMENTS 2,481,111  9/1949  Griswold .................... 215/324

FOREIGN PATENT DOCUMENTS 52-19772  2/1977  Japan .................... 264/235
54-68385  6/1979  Japan .................... 264/532

*Primary Examiner*—William Price
*Assistant Examiner*—Sue A. Weaver
*Attorney, Agent, or Firm*—Parkhurst & Oliff

[57] ABSTRACT

A hollow, blow-molded container of a biaxially oriented saturated polyester resin in which the upper part of the neck section is formed thicker than the intermediate section, and the upper half part of the upper part is formed thicker than the lower half part of the upper part. Thus, a cap can be exactly mounted on the neck section of this container, and the quantity of the material of the neck section can be reduced.

5 Claims, 1 Drawing Figure

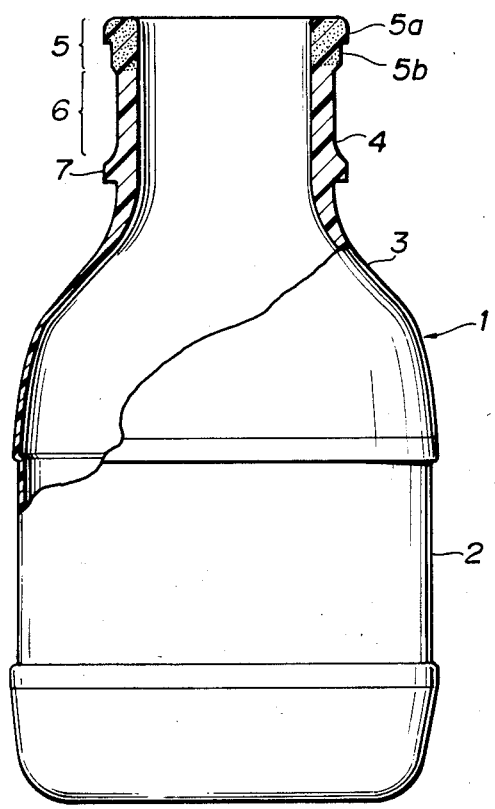

CONTAINER OF POLYETHYLENE TEREPHTHALATE OR SATURATED POLYESTER RESIN

CROSS-REFERENCE TO RELATED APPLICATION

This is a continuation of application Ser. No. 331,872 filed Dec. 17, 1981, now abandoned.

This application is related in part to pending application Ser. No. 413,560, filed Aug. 31, 1982, now abandoned.

BACKGROUND OF THE INVENTION

The present invention relates to a hollow blow-molded container of a biaxially oriented saturated polyester resin or polyethelane terephthalate.

Saturated polyester resin has a wide range of applications as the material of containers such as bottles and the like, because it has excellent physical properties such as gas barrier characteristics and so forth.

A conventional bottle-shaped container of the biaxially oriented saturated polyester resin can be strengthened by the biaxial orientation, can save the quantity of the material by the reduction in the thickness of the container due to the biaxial orientation, does not permit the escape of detrimental substance such as solvent or the like from the container, and does not produce toxic gas when it is incinerated after its disposal. Such bottle-shaped containers are formed, due to the convenience of molding, thin at only the neck section and thick at the shoulder, body and bottom sections according to the biaxial orientation. During biaxial orientation blow molding, the thermal deformation temperature is extremely low. When high temperature liquid is, for example, filled in the container for heat-sterilization, the container is thermally shrunken making it impossible to fill the container accurately. Therefore, it is necessary to be subject the container to heat treatment simultaneously with or after its formation so as to enhance the thermal deformation temperature of the biaxially oriented sections of the container. It is also necessary to carry out the heat treatment to prevent a deterioration of the dimensional accuracy caused by high temperature, to prevent the occurrence of chatter, and to improve the caping accuracy by increasing the surface hardness, so as to strengthen the thick neck section of the container which is not biaxially oriented. Because the neck section of the conventional container is not biaxially oriented during blow molding, the resultant container has unstable physical properties and is susceptible to thermal deformation. However, containers, such as bottle-shaped containers, maybe required to be very tightly sealed because of the contents to be contained therein. Therefore, the neck section or end of such container is usually sealed or caulked by either a crown cap or a cap placed thereon with interposition of a packing. However, if the neck section is deformed by an external factor such as heat, the aforementioned sealing effect of the sealing means is diminished.

The conventional container of the polyethylene terephthalate resin is normally heat treated, after it is blow-molded by so-called thermal setting at a temperature exceeding the softening point of the polyethylene terephthalate resin so as to improve the thermal resistance thereof. Although the container body is subject to small thermal deformation, the neck section of the container will not be affected even by a small deformation due to the reasons described above.

The polyethylene terephthalate resin has another important feature in its transparency. The physical properties and qualtities of the contents sometimes deteriorate due to external light, depending on their properties and hence the container may need to impart resistance against external light.

SUMMARY OF THE INVENTION

Accordingly, an object of the invention is to provide a hollow, blow-molded container of a biaxially oriented polyethylene terephthalate or saturated polyester resin, in which the thick neck section can be efficiently and effectively heat treated, the material of the neck section can be reduced, and the neck section's heat treated state will be evident from its excellent colored outlook.

Another object of the invention is to provide a hollow, blow-molded container of a biaxially oriented polyethylene terephthalate or saturated polyester resin, in which the upper end of the neck section is thickly strengthened and the lower half of the upper end of the neck section is thinly formed to reduce the quantity of the material used therein.

Still another object of the invention is to provide a hollow, blow-molded container of a biaxially oriented polyethylene terephthalate or saturated polyester resin, in which the upper part of the neck section is increased in diameter larger than the intermediate part thereof, and the upper half of the upper part thereof is increased in diameter larger than the lower half part of the upper part thereof so as to provide an exact mounting for a cap.

Still another object of the invention is to provide a hollow, blow-molded container of a biaxially oriented polyethylene terephthalate or saturated polyester resin, in which the upper part of the neck section is crystallized on the surface to secure the exact tightening of the cap, and the crystallized part can be recognized, by its excellent color, as the crystallized biaxial orientation bottle-shaped container which is a different color from the non-crystallized part so as to enhance the value of the container as a commodity.

Still another object of the present invention is to provide a hollow, blow-molded container of a biaxially oriented polyethylene terephthalate or saturated polyester resin, in which all the aforementioned disadvantages of the conventional container can be eliminated and in which the container's resistance against external light is improved.

Still another object of the present invention is to provide a hollow, blow-molded container of a biaxially oriented polyethylene terephthalate or saturated polyester resin, in which the neck section thereof is rigidly formed having stable physical properties.

A further object of the present invention is to provide a hollow, blow-molded container of a biaxially oriented polyethylene terephthalate or saturated polyester resin, in which light from the exterior can be effectively shielded to improve the container's resistance thereto.

Yet another object of the present invention is to provide a hollow, blow-molded container of a biaxially oriented polyethylene terephthalate or saturated polyester resin, in which the neck section is not thermally affected nor deformed.

Still another object of the present invention is to provide a hollow, blow-molded container of a biaxially oriented polyethylene terephthalate or saturated polyester resin, in which the neck section is not varied in size.

Still another object of the invention is to provide a hollow, blow-molded container of a biaxially oriented polyethylene terephthalate or saturated polyester resin, in which the thick neck section is colored densely as compared with the other such as body, shoulder and bottom, sections with preferably contrast in external appearance such that another article appears to be mounted on the top thereof.

BRIEF DESCRIPTION OF THE DRAWINGS

The above and other related objects and features of the invention will be apparent from the following description of the disclosure found in the accompanying drawings and the novelty thereof pointed out in the appended claims.

FIG. 1 is an elevational side view, partly in cross section, of a preferred embodiment of the container of the invention.

DESCRIPTION OF THE PREFERRED EMBODIMENTS

Referring now to FIG. 1, which shows a preferred embodiment of the hollow, blow-molded bottle-shaped container of a biaxially oriented saturated polyester resin, a bottle-shaped container 1 of saturated polyester resin, a body 2, a neck section 4, and a shoulder 3.

The neck section 4 of the container 1 is formed much thicker than the body 2 since the neck section of a preformed parison is held in a mold and high pressure air is blown into the parison while longitudinally and biaxially orienting the parison into the blow-molded bottle-shaped container. The neck section of the parison, held by the mold, is not oriented, and hence becomes the thick neck section of the blow-molded bottle-shaped container.

The upper part 5 of the neck section 4 of the container 1 is so formed as to be thicker and larger in outer diameter than the intermediate section 6 of the neck section 4. The upper half part 5a of the upper part 5 is formed thicker and larger in outer diameter than the lower half part 5b of the upper part 5. It is preferable to provide a stepped part between the upper half part and the lower half part as well as between the lower half part of the upper part and the intermediate part. It is noted that the thickness of the upper half part of the upper part is wide enough to provide the strength necessary for the capping of the neck section, the lower half part is not as thick as the upper half part of the upper part, and the intermediate part is not as thick as the lower half part of the upper part. It is preferable to form a reinforcing projecting strip 7 peripherally on the lower outer surface of the neck section of the container.

Then, the upper part and hence the upper half part and the lower half part thereof of the neck section of the container is crystallized. The crystallization is effectuated by heating the neck higher than a glass transition temperature and gradually cooling it. In order to mainly crystallize the upper part of the neck section of the container, a heat shielding plate may be wound on the neck section except for the upper part of the container the plate being removed after it is heated. The upper part of the neck section of the container is discolored due to the crystallization. When the bottle-shaped container is, for example, colorless and transparent, the crystallized part becomes white like milk, and when it is colored and transparent, the crystallized part becomes opaque in the color of the container.

It should be understood from the foregoing description that since only the upper part of the neck section of the container is thickened and the upper half part of the upper part of the neck section is further thickened over the lower half part of the upper part thereof, the upper end of the neck section of the container is thickly stengthened and the lower half part of the upper end of the neck section is thinly formed to reduce the quantity of the material used therein. It should also be appreciated that since the upper half part of the neck section is larger in diameter than the lower half part of the upper part of the neck section the exact mounting of a cap can be secured to the bottle-shped container. It should also be noted that since the upper part of the neck section of the container is crystallized on the surface, cap can be secured and precisely tightened to the bottle-shaped container. Because the crystallized part of the neck section of the container can be distinguished in its external appearance as the crystallized biaxial orientation bottle-shaped container due to the different color of the non-crystallized part of the neck section, the value of the container as a commodity can be enhanced. When the preformed piece is molded, a predetermined pigment is added to the material therefore so that the container body 1 when blow-molded is colored and transparent or opaque. The neck section 4 of the container 1 is crystallized by a heat treatment using the temperature control.

The container body 2 is colored and transparent or opaque as described above, so as to prevent the transmission of external light into the container 1 to improve the resistance of the container and to hence prevent the deterioration of the contents contained in the container 1.

The reason the neck section 4 of the container is crystallized is because the polyethylene terephthalate resin becomes physically and rigidly stablized by the crystallization to resist thermal deformation, thus enabling the neck section 4 to be unaffected by the heat treatment which occurs when the container of the polyethylene terephthalate resin is blow-molded. When the preformed piece or parison is biaxially blow-molded, the neck section 4 is not oriented is therefore susceptible to crystallization and accordingly readily becomes brittle due to the crystallization, but since the neck section is thickened, it is firmly strengthened.

It should be understood from the foregoing description that since the container body of the polyethylene terephthalate resin is entirely colored, it can effectively shield light from the exterior to improve the container's resistance thereto. It should also be appreciated that since the neck section of the container is crystallized, it is not thermally affected nor deformed, and accordingly it is not anticipated that the neck section will be deformed or varied in size due to the high temperature created by either the thermal setting step for the entire container or the high temperature of a content liquid such as juice or milk which is filled within the container to be heat sterilized. It should also be noted that since the neck section of the container is rigidly treated, it can be conveniently caulked with a crown cap and effectively maintain the dimensional accuracy thereof.

It should also be appreciated that since the neck section of the container is crystallized and thickened, it is densely colored as compared with the other sections such as body, shoulder and bottom with preferably contrast in the external appearance such that another article appears to be mounted decoratively on the top thereof.

It should also be noted that since the container of the polyethylene terephthalate resin, constructed according to the present invention, is colored and transparent or opaque, it has excellent light resistance, and because the neck section of the container is crystallized, it is rigid and not susceptible to thermal deformation.

What is claimed is:

1. A hollow blow-molded container of polyethylene terephthalate resin comprising:
   (a) a biaxially oriented and uncrystallized body section; and
   (b) a neck section comprising an upper part and an intermediate part, said upper part comprising an upper half part and a lower half part, said intermediate part being adjacent to an upper end of said body section, said upper half part being larger in diameter and of a greater wall thickness than said lower half part, a stepped part being formed between said upper half part and said lower half part, said lower half part being larger in diameter and of greater wall thickness than said intermediate part, a stepped part being formed between said lower half part and said intermediate part, said intermediate part being adjacent to and of greater wall thickness than said body section, said upper half part and said lower half part being crystallized, and said intermediate part being uncrystallized.

2. A hollow blow-molded container of polyethylene terephthalate resin according to claim 1 wherein said body section and said neck section comprise a colored pigment for increasing the resistance of said container to outside light.

3. A hollow blow-molded container of polyethylene terephthalate resin according to claim 2 wherein said body section is substantially opaque.

4. A hollow blow-molded container of polyethylene terephthalate resin according to claim 2 wherein said body section is transparent.

5. The hollow blow-molded container of claim 1 wherein said container body section is thermally set.

* * * * *